(12) United States Patent
Gutta et al.

(10) Patent No.: US 6,240,483 B1
(45) Date of Patent: May 29, 2001

(54) SYSTEM FOR MEMORY BASED INTERRUPT QUEUE IN A MEMORY OF A MULTIPROCESSOR SYSTEM

(75) Inventors: Srinivasa Gutta, Allentown, PA (US); Walter G. Soto, Irvine, CA (US); Raman Parthasarathy, New Brunswick, NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/140,673

(22) Filed: Aug. 26, 1998

Related U.S. Application Data

(60) Provisional application No. 60/065,855, filed on Nov. 14, 1997.

(51) Int. Cl.[7] ....................................................... G06F 13/24
(52) U.S. Cl. ............................................. 710/260; 710/263
(58) Field of Search .................................... 710/260, 263, 710/264, 268, 269

(56) References Cited

U.S. PATENT DOCUMENTS

| | | | | |
|---|---|---|---|---|
| 4,675,865 | * | 6/1987 | DeVries et al. | 370/85 |
| 5,428,794 | * | 6/1995 | Williams | 710/260 |
| 5,664,231 | * | 9/1997 | Postman et al. | 710/73 |
| 5,675,807 | * | 10/1997 | Iswandhi et al. | 710/260 |

* cited by examiner

*Primary Examiner*—Ario Etienne
(74) *Attorney, Agent, or Firm*—William H. Bollman

(57) ABSTRACT

An interrupt mechanism which reduces or eliminates the need for an interrupt status register while at the same time provides suitable information to a host or other processor with respect to the cause and parameters surrounding an interrupt signal. An interrupt queue is maintained in shared memory accessible by both a host and an interrupting agent. The interrupt queue has a capacity or two or more separate interrupt requests, either from a same interrupting agent or from two different interrupting agents. As interrupting agents write to the interrupt queue, an agent current interrupt pointer (ACIP) is incremented to a next position in the interrupt queue. As the host services interrupts, the current host pointer is incremented to clear the serviced interrupt request entry.

22 Claims, 2 Drawing Sheets

INTERRUPT REQUEST ENTRY

SYSTEM FOR MEMORY BASED INTERRUPT QUEUE IN A MEMORY OF A MULTIPROCESSOR SYSTEM

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to the use of interrupts between a plurality of processors. More particularly, it relates to an interrupt technique which provides the capability of a conventional interrupt status register without requiring an interrupt status register.

2. Background of Related Art

FIG. 4 shows a conventional technique for handling interrupt signals 670a, 670b from any of one or more agents 630, 632 (e.g., a microprocessor, microcontroller or digital signal processor (DSP)) to a host 620 (e.g., another microprocessor, microcontroller or DSP).

Conventionally, the interrupt signals 670a, 670b are received by appropriate buffering or interfacing circuitry 661a, 661b, and latched for output in an interrupt status register 660. In the conventional method, the host 620 includes appropriate interface circuitry 661a, 661b and at least one bit reserved in the interrupt status register 660 for each interrupting agent 630, 632. However, more detailed information relating to the cause of the interrupt is generally maintained in a set of registers or in a first-in, first-out type memory element in the agent generating the interrupt. The registers are typically addressable by the host either through an input/output (I/O) address ("I/O mapped") or through a memory address ("memory mapped").

For instance, in an application wherein each agent 630, 632 is handling a plurality of data streams, any one data stream (or any time slot within that data stream) can cause an interrupt. However, conventionally only one interrupt line is provided between the interrupting agent 630 or 632 and the host 620. Additional interrupt lines may complicate the circuitry and interrupt servicing of the host computer 620.

Thus, to gain additional information with respect to an interrupt, when one processor (e.g., host 620) is interrupted by another processor (e.g., agent 630 or 632), the host 620 will typically read its interrupt status register 660 to determine the source of the interrupt and, upon servicing of that interrupt request, read a register or other device in the agent 630 or 632 to determine more information regarding the cause of the interrupt.

After the interrupt is serviced, the host 620 will clear the interrupt request latched in the interrupt status register typically as part of an interrupt service routine (ISR).

In addition to the interrupt status register 660, the host 620 will typically further include an interrupt mask register 667 to programmably mask off unwanted interrupts.

The necessary circuitry such as the interface circuitry 661a, 661b, the interrupt status register 660, and/or the interrupt mask register 667 utilize valuable silicon and complicate the circuitry of a host 620, particularly where an agent 630 and/or 632 may cause an interrupt to the host 620 for any of a multitude of reasons, e.g., sourced from any of a multiple of data streams and/or time slots.

Ideally, particularly in a multiple data stream system, the interrupt status register 660 in a host 620 or other processor would reflect at least minimal information regarding the exact cause of the interrupt to avoid the need for the host 620 to then inquire of the agent 630 or 632 to determine the cause, wasting efficiency in the overall system architecture. For instance, in a multiple data stream environment, information regarding the identification of the stream number causing the interrupt is considered to be important information by the present inventors. However, since all data streams are typically independent, the resulting causes of a single agent's interrupt signal are correspondingly independent, and essential data stream information may not be efficiently encoded into the interrupt status register 660 of the host 620. Moreover, a significant amount of physical area of silicon in the host 620 and in the agents 630, 632 would be required to provide such information in an interrupt signal (e.g., data stream number and interrupt type), particularly as the number of data streams increases.

There is thus a need for an interrupt mechanism and signal which provides a host with suitable information to identify the source of the interrupt. There is also a need to minimize the amount of additional circuitry necessary to implement an informative interrupt mechanism.

SUMMARY OF THE INVENTION

It is an aspect of the invention to provide a multiprocessor system comprising a host, a memory, at least one agent coupled to the host on an interrupt basis, and an interrupt buffer maintained within the memory. The interrupt buffer is adapted to contain a plurality of interrupt requests to the host from at least one agent.

A method of handling interrupts in accordance with the principles of the present invention comprises establishing an interrupt queue per interrupting agent in a memory location accessible by a plurality of processors, the interrupt queue including at least two locations in the memory. An interrupt is requested from a first of the plurality of processors by writing an encoded interrupt request entry to the interrupt queue. The interrupt request is detected from a second of the plurality of processors by reading the encoded interrupt request entry from the interrupt queue.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, existing architecture is utilized to implement a suitable interrupt mechanism which reduces or eliminates the need for an interrupt status register while at the same time provides suitable information to a host or other processor with respect to the cause and parameters surrounding an interrupt signal.

Figure 1:
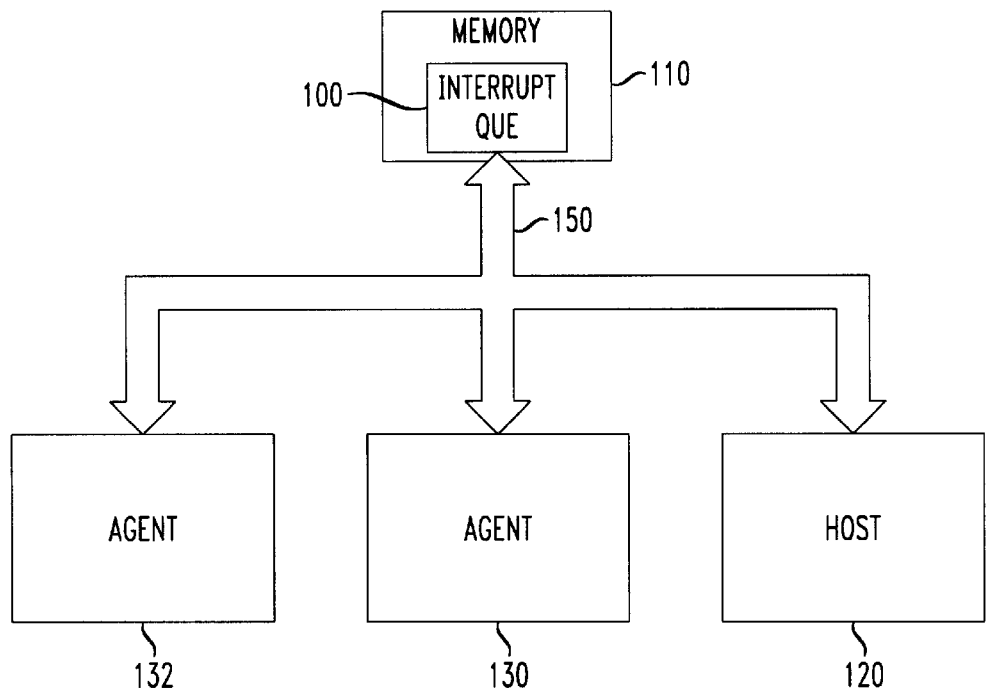
FIG. 1 shows a plurality of agents causing interrupt signals accessible by a host using an interrupt queue in a block of memory in accordance with the principles of the present invention.

In particular, FIG. 1 shows an interrupt queue 100 in shared memory 110 created in shared memory in accordance with the principles of the present invention.

In particular, FIG. 1 shows a host 120 and two agents 130 and 132 which cause interrupts in the host 120. The host and the agents each may be any processing element, e.g., a microprocessor, microcontroller, DSP or a direct memory access (DMA) engine. The host 120 may receive interrupt request signals from any or all of many devices, e.g., agents 130, 132.

In accordance with the principles of the present invention, the status of interrupt request signals from any of the agents 130, 132 are maintained by the host 120 in a block of memory 100 and queued for execution. It is the responsibility of an interrupting agent to write an interrupt request in the interrupt queue.

Figure 4:
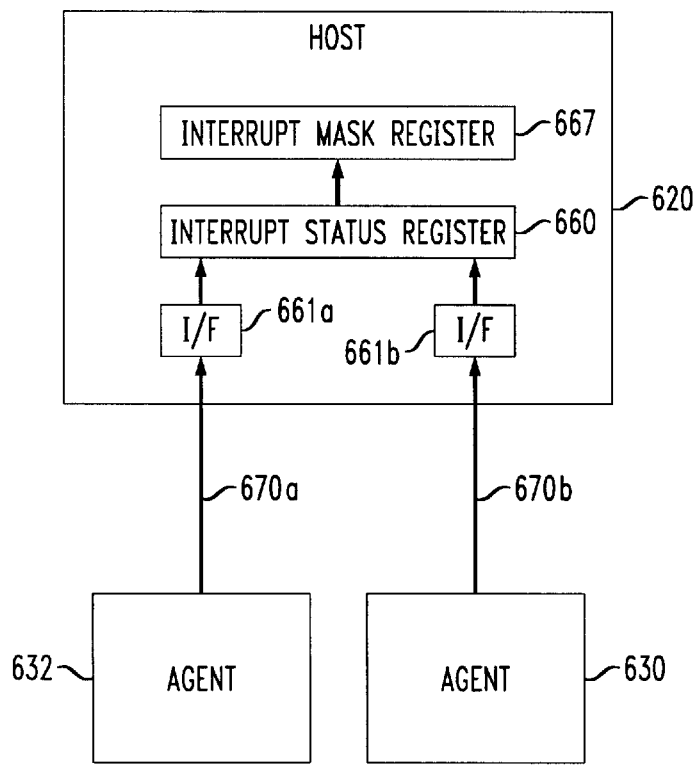
FIG. 4 shows a conventional interrupt mechanism including interrupt interface circuitry, an interrupt status register, and an interrupt mask register.

The interrupts may relate to a request for any type service by the host computer. Importantly, rather than relying on the conventional interrupt signals 670a, 670b, interfacing circuitry 661a, 661b, interrupt status register 660 and interrupt mask register 667, e.g., as shown in FIG. 4, the agents 130 and 132 in FIG. 1 cause an interrupt to the host 120 using an interrupt queue 100 formed in shared memory 110.

Although located in shared memory in the disclosed embodiment, an interrupt queue 100 may be formed in any memory accessible by the host 120.

Figure 2:
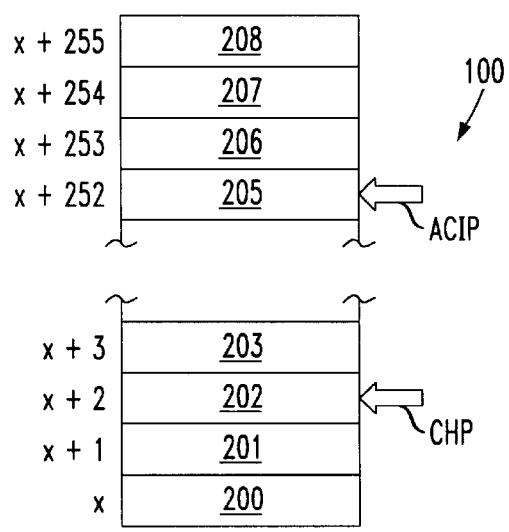
FIG. 2 shows an exemplary interrupt queue having a capacity of 256 bytes of memory, in accordance with the principles of the present invention.

FIG. 2 shows an example of an interrupt queue 100 having a capacity of 256 entries in accordance with the principles of the present invention. Although FIG. 2 shows an interrupt queue having a capacity of 256 entries, the present invention is equally applicable to interrupt queues having much smaller or much larger capacities. For instance, the interrupt queue may have as few as two entries or as many as 1048 or more entries within the principles of the present invention.

In FIG. 2, the interrupt queue 100 is located anywhere within a memory map or I/O map of the host 120. For instance, as shown in FIG. 2, the lowest addressable available memory location 200 utilized by the interrupt queue 100 is located at memory address x, and the highest addressable available memory location 208 is offset from memory address x by 255. The location of the interrupt queue 100, either in memory mapped or in I/O mapped space, including the starting address and length of the interrupt queue 100, are preferably programmable by the host. Of course, the present invention is equally applicable to an interrupt queue 100 having a fixed length and a fixed address.

The host 120 will inform the interrupting agent 130 or 132 of the starting address x and the length of the interrupt queue 100. It is the responsibility of the interrupting agent to make entries into the interrupt queue 100 and to increment the address pointer, referred to herein as the agent current interrupt pointer ACIP shown in FIG. 2. The agent thus makes an interrupt request entry in the interrupt queue 100 and will increment its ACIP. Upon initialization, the agent current interrupt pointer ACIP will be pointing to the starting address x, i.e., to entry 200 as shown in FIG. 2.

The host will also inform the interrupting agent 130 or 132 of the current interrupt request entry in the interrupt queue 100 that the host has finished servicing by passing an 8-bit offset pointer called the Current Host Pointer CHP. Upon initialization, the current host pointer CHP will preferably contain the address of and thus point to the last entry in the interrupt queue 100, i.e., to entry 208 as shown in FIG. 2.

An agent 130, 132 may send an interrupt signal to the host by writing an interrupt request entry 299 (FIG. 3) to the interrupt queue 100 at an address pointed to by the agent current interrupt pointer ACIP. The agent current interrupt pointer ACIP is located either at another location in the shared memory 110 or maintained inside the agent's memory. The agent can also maintain the agent current interrupt pointer ACIP as a dedicated register with a built-in incrementer. As the interrupt queue 100 becomes utilized, the agent current interrupt pointer ACIP is updated in a circular fashion. Thus, the agent current interrupt pointer ACIP will incrementally increase its pointed-to address location as the number of interrupt request entries in the interrupt queue 100 increases. When the host services the interrupt request entry in the interrupt queue 100, it will increment its current host pointer CHP to point to the next address location.

Upon initialization, the current host pointer CHP will be pointing to the last address and the agent current interrupt pointer ACIP will be pointing to the starting address of the interrupt queue, indicating that the interrupt queue 100 is empty. When the current host pointer CHP and agent current interrupt pointer ACIP are equal, it implies that the interrupt queue 100 is full. Thus, the current host pointer CHP can be viewed as a water mark indicating the empty and full status of the interrupt queue 100.

Figure 3:
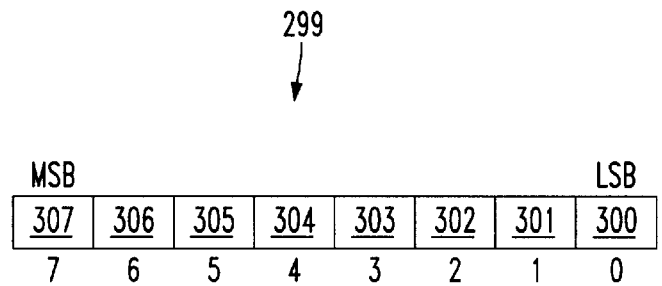
FIG. 3 shows an exemplary entry in the interrupt queue shown in FIG. 2.

FIG. 3 shows an interrupt request entry 299 in more detail. Of course, the interrupt request entry 299 shown in FIG. 3 is exemplary only and in no way limiting as to the length and/or content of an interrupt request entry within the scope of the present invention. Use of the individual bits 300 to 307 of the interrupt request entry 299 will vary based on the particular application.

For instance, in a first embodiment, the agent 130 or 132 causing an entry in the interrupt queue will preferably always check the current interrupt entry before writing a new interrupt entry to the interrupt queue 100. In another embodiment, the agent 130 or 132 causing an interrupt entry in the interrupt queue 100 will not check the current interrupt entry before writing a new interrupt entry to the interrupt queue 100 so long as the interrupt queue has room, i.e., is not full.

In particular, in the first embodiment wherein the interrupting agent first checks the current entry in the interrupt queue 100, the host 120 provides the interrupting agent 130 or 132 causing an interrupt request to be entered in the interrupt queue with a 32-bit (or 16-bit or 64-bit depending upon the particular processors used) starting address x of the interrupt queue 100 to indicate the location in the chosen memory (e.g., I/O or memory space) of the lowest addressable location 200 of the interrupt queue 100 (FIG. 2). The host 120 will also provide the interrupting agent 130, 132 with the maximum length of the interrupt queue 100, e.g. an 8-bit register indicating a maximum length of 256 words. Of course, the invention is equally applicable to interrupt queues in any type of memory and of any length, but preferably allowing more than one entry and more preferably allowing at least 256 entries.

The interrupt queue 100 may be operable in any of a plurality of modes. For instance, the host 120 may maintain another location in the memory 100 or a register in the host 120 containing one or more bits to indicate whether or not the interrupting agent is to check the current interrupt request entry before writing a new interrupt request entry.

An interrupting agent 130 or 132 will cause an interrupt in the host 120 by writing an interrupt request entry in the interrupt queue 100. Preferably, one bit of the interrupt request entry will be set to a predetermined logic state, e.g., with the most significant bit (MSB) set to a '1'. This set bit will indicate to the host 120 that the relevant interrupt encoded in the remaining bits of the interrupt request entry is pending and that it should be serviced.

Preferably, information relating to the specific source and/or cause of the interrupt will be included in the interrupt request entry made in the interrupt queue 100. For instance, in the disclosed embodiment including a plurality of data streams handled by the agents 130, 132, the relevant interrupt request entry in the interrupt queue 100 may include the data stream number and/or the interrupt type.

Moreover, or alternatively, the interrupt request entry in the interrupt queue 100 may include a desired or requested priority of servicing for the corresponding device or data stream.

Preferably, the host 120 will clear the MSB of the interrupt request entry after it has completed servicing the interrupt, and more preferably will clear the interrupt request entry by incrementing the current host pointer CHP by one.

Thus, in the first embodiment or mode of operation, the interrupting agent 130 or 132 requesting servicing of an interrupt by the host 120 will essentially ignore the value of the current host pointer CHP. Instead, the interrupting agent 130 or 132 will check the MSB 307 (FIG. 3) or other designated bit of the current interrupt request entry. If the MSB is in a first predetermined state (e.g., at a logic '0'), the agent 130 or 132 will interpret the interrupt request queue 100 as having an empty location and accordingly write the current interrupt request entry to the interrupt queue 100. If, on the other hand, the MSB is in a second state (e.g., at a logic '1'), then the agent 130 or 132 will interpret the interrupt queue 100 as being full, and thus the agent will not write to the interrupt queue 100.

In the second embodiment of an interrupt request entry, the interrupting agent causing an interrupt request entry will write to the interrupt queue 100 without first checking the status of the current interrupt request entry (as indicated by the most significant bit (MSB) of the interrupt request entry) so long as the interrupt queue has room, i.e., is not full. Otherwise, the second embodiment of an interrupt request entry operates as described with respect to the first embodiment of an interrupt request entry.

In this embodiment, the host 120, after being interrupted, preferably services as many interrupt request entries in the interrupt queue 100 as possible. Alternatively, the host 120 will service only one interrupt request entry in the interrupt queue 100 at a time.

After servicing the interrupts, the host 120 will update the current host pointer CHP to indicate the location of the last interrupt entry serviced in the interrupt queue 100.

Other mechanisms may be utilized by the interrupting agents to determine if and when the interrupt queue 100 is full. For instance, each agent 130 and/or 132 may maintain a mirror of the current host pointer CHP to compare to the current host pointer of the host 120. Upon determination that the interrupt queue 100 is full, the agents 130, 132 can not write additional interrupt request entries to the interrupt queue 100 until the host services an interrupt request entry and thus makes room for a new interrupt request entry.

A full interrupt queue 100 is considered a catastrophic event which, upon discovery by an agent 130 or 132, will stop operation by an agent (e.g., will stop a data stream transfer) until resolved. The agent may utilize a conventional interrupt signal or otherwise indicate to the host 120 that such a catastrophic event has occurred and requires immediate resolution. When the host interrupt service request (ISR) clears the catastrophic event, the agents 130, 132 can thereafter resume operation, e.g., proceed with processing a data stream transfer.

In the first described mode of operation of the interrupt queue 100, the burden is on the interrupting agent to read and check that the interrupt queue 100 is empty before writing an interrupt request entry to the interrupt queue 100. In the second described mode of operation, the burden is on the host 120 to update the current host pointer CHP.

Conventional interrupt masking may be handled in software resident in the host 120 as desired by the particular application.

The invention takes advantage of memory already associated with or embedded in a host, e.g., dynamic random access memory, by providing a memory based interrupt queue. The present invention generally provides a scaleable and flexible architecture without increasing the required area of silicon, particularly in systems or processors which already include a shared block of memory.

Advantages of the present invention include reduction of size, i.e., required silicon, particularly in an interrupting agent, by creating and maintaining a memory based interrupt queue. Moreover, by maintaining a memory based interrupt queue in accordance with the principles of the present invention, a single agent can queue up a plurality of interrupt signals for a host to service. Additionally, use of different modes of operation of the memory based interrupt queue, e.g., by checking or ignoring the current host pointer CHP, provides flexibility, efficiency and trade-off possibilities in an overall system design.

While the described embodiment of the present invention allows for the elimination of an interrupt status register and related registers and circuitry with respect to one or more agents, the present invention is equally applicable to the combination of an interrupt queue in accordance with the principles of the present invention with a conventional interrupt status register for the same or different agents.

While the invention has been described with reference to the exemplary embodiments thereof, those skilled in the art will be able to make various modifications to the described embodiments of the invention without departing from the true spirit and scope of the invention.

What is claimed is:

1. A multi-processor system, comprising:

a host;

a memory;

at least one agent coupled to said host on an interrupt basis; and an interrupt buffer maintained within said memory, said interrupt buffer being adapted to contain a plurality of interrupt requests to said host from said at least one agent wherein said at least one agent writes an interrupt request into said interrupt buffer, wherein said at least one agent writes interrupt requests directly to said interrupt buffer.

2. The multi-processor system according to claim 1, wherein:

said interrupt buffer includes at least 8 bits of information with respect to each interrupt from said at least one agent.

3. The multi-processor system according to claim 2, wherein:

said interrupt buffer has a capacity of at least 256 interrupt requests from said at least one agent.

4. The multi-processor system according to claim 1, wherein:
said memory is random access memory.

5. The multi-processor system according to claim 4, wherein:
said random access memory is dynamic random access memory.

6. The multi-processor system according to claim 1, wherein:
said memory is embedded with said host.

7. A method of handling interrupts, said method comprising:
establishing an interrupt queue in a memory location accessible by a plurality of processors, said interrupt queue including at least two locations in a memory;
creating an agent current interrupt pointer configured with a starting address and a length of said interrupt queue;
requesting an interrupt from a first of said plurality of processors by writing an encoded interrupt request entry to said interrupt queue;
incrementing said agent current interrupt pointer by said first of said plurality of processors; and
detecting said interrupt request by a second of said plurality of processors by reading said encoded interrupt request entry from said interrupt queue.

8. The method of handling interrupts according to claim 7, wherein said encoded interrupt request entry comprises:
a priority of said interrupt.

9. The method of handling interrupts according to claim 8, wherein said encoded interrupt request entry comprises:
a source of said interrupt.

10. The method of handling interrupts according to claim 7, wherein said encoded interrupt request entry comprises:
a cause of said interrupt.

11. The method of handling interrupts according to claim 7, wherein said interrupt queue comprises:
a circular buffer.

12. The method of handling interrupts according to claim 7, further comprising:
incrementing said agent current interrupt pointer when an interrupt request entry is added to said interrupt queue.

13. The method of handling interrupts according to claim 7, further comprising:
decrementing said agent current interrupt pointer when a pending interrupt request entry is serviced.

14. A method of handling interrupts, said method comprising:
establishing an interrupt queue in a memory location accessible by a plurality of processors, said interrupt queue including at least two locations in a memory;
creating an agent current interrupt pointer configured with a starting address and a length of said interrupt queue;
requesting an interrupt from a first of said plurality of processors by writing an encoded interrupt request entry to said interrupt queue;
incrementing said agent current interrupt pointer by said first of said plurality of processors;
detecting said interrupt request by a second of said plurality of processors by reading said encoded interrupt request entry from said interrupt queue; and
requesting a second interrupt from said first of said plurality of processors by writing a second encoded interrupt request entry to said interrupt queue.

15. An apparatus for handing interrupts, comprising:
interrupt queue means for storing a plurality of interrupt requests, said interrupt queue means being located in a memory area accessible by a plurality of processors, said interrupt queue means including at least two locations in a memory;
means for creating an agent current interrupt pointer configured with a starting address and a length of said interrupt queue;
means for requesting an interrupt from a first of said plurality of processors by writing an encoded interrupt request entry to said interrupt queue means;
means for incrementing said agent current interrupt pointer by said first of said plurality of processors; and
means for detecting said interrupt request by a second of said plurality of processors by reading said encoded interrupt request entry from said interrupt queue means.

16. The apparatus for handling interrupts according to claim 15, wherein said encoded interrupt request entry comprises:
a priority of said interrupt.

17. The apparatus for handling interrupts according to claim 15, wherein said encoded interrupt request entry comprises:
a source of said interrupt.

18. The apparatus for handling interrupts according to claim 15, wherein said encoded interrupt request entry comprises:
a cause of said interrupt.

19. The apparatus for handling interrupts according to claim 15, wherein said interrupt queue means comprises:
a circular buffer.

20. The apparatus for handling interrupts according to claim 15, further comprising:
means for incrementing said means for maintaining said agent current interrupt pointer when an interrupt request entry is added to said interrupt queue means.

21. The apparatus for handling interrupts according to claim 15, further comprising:
means for decrementing said means for maintaining said agent current interrupt pointer when a pending interrupt request entry is serviced.

22. An apparatus for handling interrupts, comprising:
interrupt queue means for storing a plurality of interrupt requests, said interrupt queue means being located in a memory area accessible by a plurality of processors, said interrupt queue means including at least two locations in a memory;
means for creating an agent current interrupt pointer configured with a starting address and a length of said interrupt queue;
means for requesting an interrupt from a first of said plurality of processors by writing an encoded interrupt request entry to said interrupt queue means;
means for incrementing said agent current interrupt pointer by said first of said plurality of processors;
means for detecting said interrupt request by a second of said plurality of processors by reading said encoded interrupt request entry from said interrupt queue means; and
means for requesting, before said second processor detects said first encoded interrupt request entry, a second interrupt from said first of said plurality of processors by writing a second encoded interrupt request entry to said interrupt queue means.

* * * * *